United States Patent [19]

Middleton

[11] 4,396,315
[45] Aug. 2, 1983

[54] CUTTING TOOLS

[76] Inventor: Burton E. Middleton, 123 Waverly Rd., Wyncote, Pa. 19095

[21] Appl. No.: 261,490

[22] Filed: May 7, 1981

[51] Int. Cl.$^3$ ............................................. B26D 1/12
[52] U.S. Cl. .................................. 407/41; 144/241; 144/231; 144/41; 407/113
[58] Field of Search ................... 407/8, 31, 36, 42, 49, 407/41, 50, 59, 61, 77, 112, 113, 167; 144/241, 218, 231

[56] References Cited

U.S. PATENT DOCUMENTS

| | | | |
|---|---|---|---|
| 2,949,662 | 8/1960 | Cook et al. | 407/77 |
| 3,286,557 | 11/1966 | Rietzler et al. | 407/41 |
| 3,481,015 | 12/1969 | Bogner | 407/41 |
| 3,624,879 | 12/1971 | Ayer | 407/41 |
| 4,341,493 | 7/1982 | Erkfritz | 407/41 |

Primary Examiner—W. D. Bray

Attorney, Agent, or Firm—Arthur H. Swanson

[57] ABSTRACT

A precision high velocity cutting tool having indexable inserts or cutting bits includes a replaceable cutting section or insert holding nest that is made of a material that is harder and stronger than that from which it is economical to make the major cutter body. The nest is easily replaced without removing the cutter body from the drive shaft or spindle. Two holding screws retain the nest on the cutter body, one of them also securing an indexable cutter insert in cooperation with a reversible clamp. The nest facilitates the replacement of that portion of the cutter body that tends to deteriorate most rapidly and enables the replacement to be confined to the damaged area of the tool. A shaver blade is included that effects, in cooperation with the main cutting inserts of the cutting tool, smoother cutting, providing a finish approximately a planed surface.

23 Claims, 18 Drawing Figures

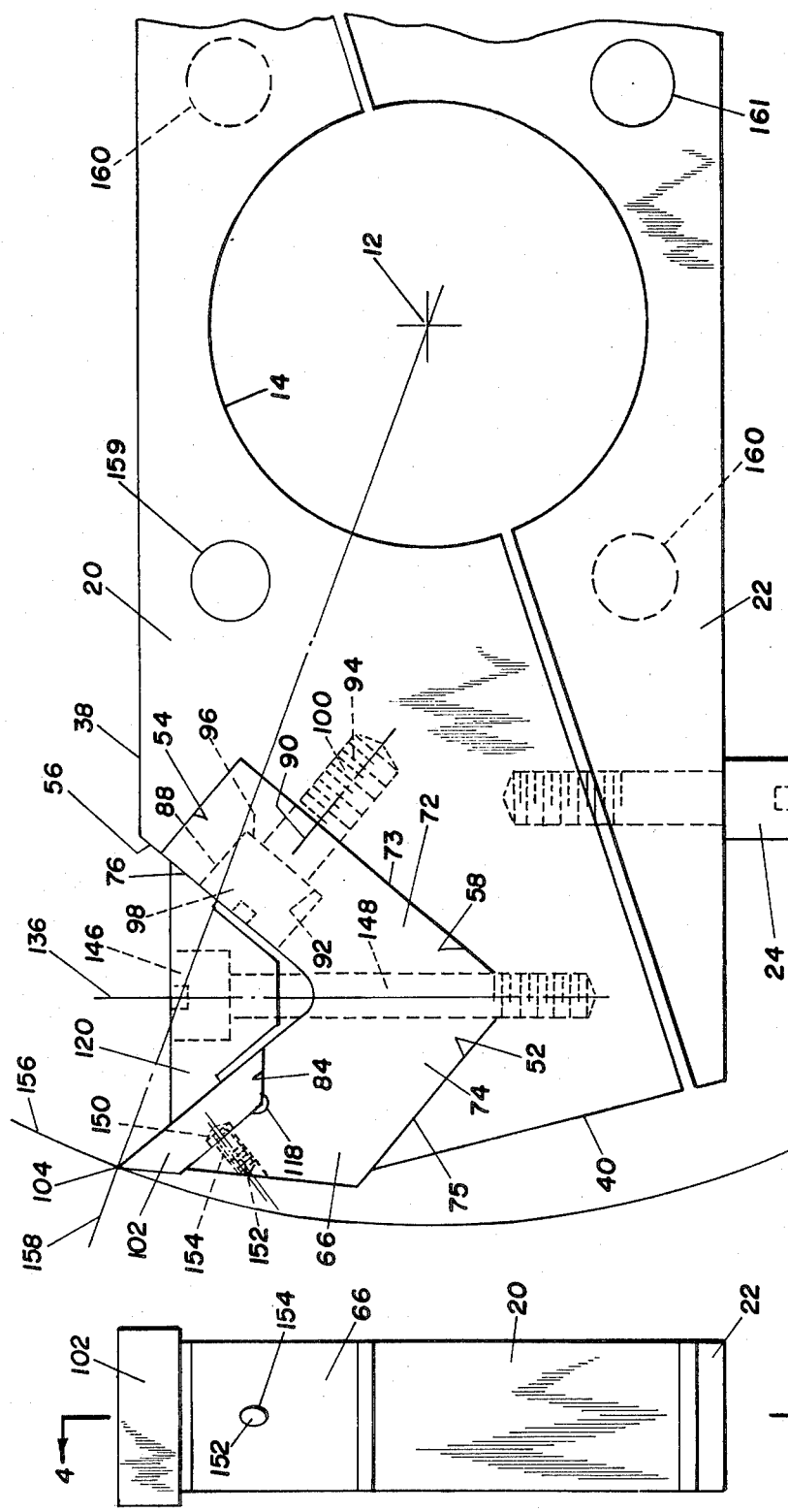

CUTTING TOOLS

BACKGROUND OF THE INVENTION

1. Field of the Invention

The present invention relates to improvements in precision cutting tools, particularly high velocity cutting tool holders having indexable inserts or cutting bits.

2. Brief Description of the Prior Art

Precision cutting tools that utilize indexable inserts or cutting bits are known in the prior art. Tools of this type, currently in extensive commerical use are disclosed in my U.S. Pat. No. 3,237,275 granted Mar. 1, 1966, the disclosure of which patent, by reference, is incorporated herein. Other patents disclosing tool holders for various purposes and having detachable or throwaway cutting bits are British Pat. No. 874,114 and U.S. Pat. Nos. 2,378,094, Nunez-Vaz, 2,521,868, Otto, 2,561,470, Hadley et al., 2,645,844, Longe, 3,050,828, Cashman et al., 3,662,444, Erkfritz, 3,818,562, Lacey, 4,182,587, Striegl, 4,182,587 and 4,194,860, Hopkins.

While the prior art cutting tools having indexable inserts have provided many advantages in high velocity cutting tools including superior cutting materials and reduced maintenance costs, they have, in common, a disadvantage of being unable to withstand to a degree that is economically desirable the extreme abuse and shock to which they are subjected in certain industrial applications, for example, the harvesting of trees and the processing of lumber. As a result, in such applications deterioration is rapid. The tool mortality rate is high, requiring frequent replacement not only of the indexable insert but also of the entire tool.

In recent years it has become extremely important in the harvesting of trees and the processing of lumber to focus greater attention on the improvement of profitability in the machining of smaller logs and the gaining of greater monetary recovery from wood chips that are formed in the process. Chip quality, consistency of size within certain parameters, is determined by rate of feed, comparative freedom from cutter clamp and holder interference during cutting and the cutting geometry employed. Chip monetary value has been found to be commensurate with size and shape of the chips produced.

In view of these considerations, and particularly, the impact thereon of excessive tool expense resulting from their high mortality rate, there has arisen a need for further improvements in the cutting tool art for lowering the rate of tool deterioration, and upon such deterioration, for facilitating the necessary replacement and confining the replacement to the damaged area. Additionally, there has arisen a need for further improvements in order to effect smoother cutting, more accurately cut surfaces, and consistency in size and shape of chips produced.

SUMMARY OF THE INVENTION

An object of the invention is to provide an improvement that enables high velocity cutting tool holders better to withstand the extreme shock and abuse to which they are subjected in use.

Another object of the invention is to provide an improvement in cutting tool holders that facilitates the necessary replacement upon deterioration, and additionally, confines the replacement to the damaged area.

A more specific object of the invention is to provide in such an improved cutting tool holder a replaceable hardened alloy cutting insert section or nest that is better adapted than the major cutter body to withstand the abuse to which the tool holder is subjected in use.

A further specific object of the invention is to provide in such an improved cutting tool holder a 4-in-1 indexable cutter insert or bit that is held in place by a reversible clamp and safety detent.

Another object of the invention is to provide an improved cutting tool that is operative to effect smoother cutting and more accurately cut surfaces.

Still another object of the invention is to provide, in cooperation with the main cutter of a cutting tool, a shaver blade that effects smoother cutting approximating a planed surface.

In accomplishing these and other objectives of the invention, there is provided a replaceable cutting insert section, specifically an insert cutting section or insert holding nest that is made of a material that is harder and stronger than that from which it is economical to make the major cutter body, which nest is easily replaced when necessary without removing the cutter body from the drive shaft or spindle. Two holding screws are provided to retain the nest on the cutter body, with one of them also securing the cutter insert in cooperation with a reversible clamp. The nest facilitates replacement of that portion of the cutter body that experience has shown deteriorates most rapidly. This enables the replacement to be confined to the damaged area of the tool.

There is further provided in accordance with the invention a 4-in-1 indexable cutter insert or bit having a safety detent on a bottom seating surface. The safety detent fits over a headless socket screw that is provided in the cutting insert section or nest and prevents excessive movement or dislodgment of the cutter insert under the clamp. The detent preferably is larger in diameter than the socket screw to allow resharpening of the cutter insert and to secure seating against a complementary seating shoulder in a machined recess in the nest.

Additionally, a hard faced holding clamp is provided. The clamp is hard faced with chrome or equivalent to resist chip erosion. It is made reversible for economy. Additionally, it is counterbored to bury the securing capscrew head and to allow free passage of the chips.

The invention further features a shaver blade in cooperation with a 4-wing chipper/edger side head cutting tool for effecting smoother cutting, providing a finish that approximates a planed surface.

These and other objects and advantages of the invention will become apparent from the following detailed description when taken in conjunction with the accompanying drawings.

BRIEF DESCRIPTION OF THE DRAWINGS

FIG. 2 is a fragmented top plan view of the cutter illustrated in FIG. 1;

FIG. 3 is an end view of the cutter as seen from the left side of FIG. 2;

DETAILED DESCRIPTION OF THE PREFERRED EMBODIMENTS

Figure 1:
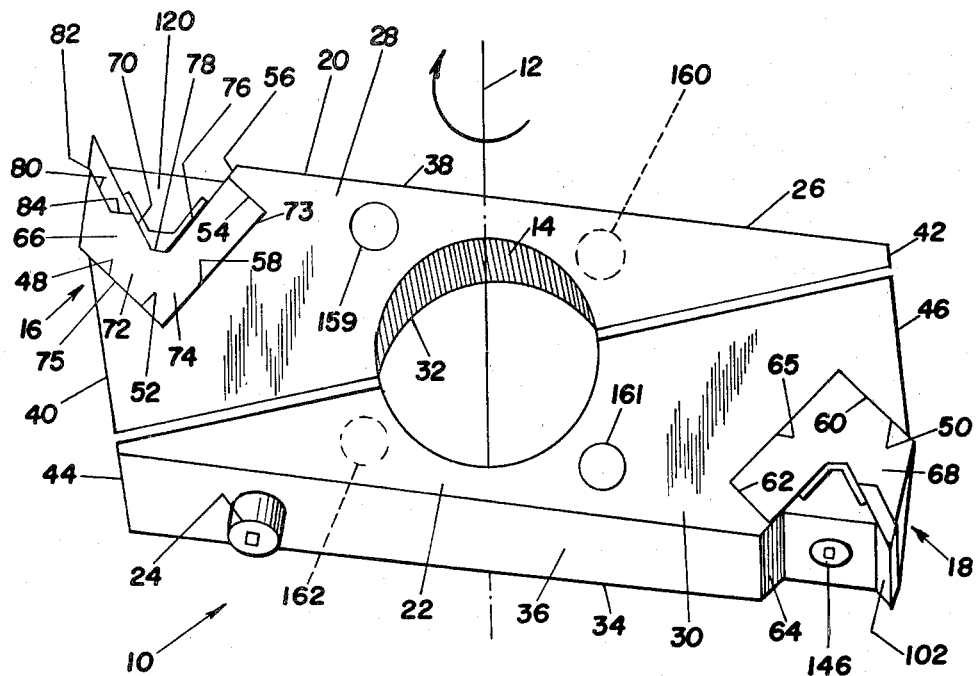
FIG. 1 is a perspective view of a first embodiment of the invention comprising a double wing, in-line chipper/edger cutting tool or cutter incorporating features of the present invention.

While principles of the invention are applicable to various types of cutters, and holders for cutters, reference herein is made, in a first illustrated embodiment of the invention, to a double wing chipper/edger indexable insert cutter 10 that is rotatable about a central axis, as indicated at 12 in FIG. 1.

As illustrated in FIG. 1, cutter 10 comprises a collar portion 14 and two diametrically oppositely disposed cutting arm regions that are indicated at 16 and 18. Cutter 10 is of a split design, being formed of two complementary arm portions 20 and 22 that are connected together by bolts 24 and 26. One-half of the collar 14 is formed in arm portion 20 of cutter 10 and the other half thereof is formed in arm portion 22.

Arm portions 20 and 22 of cutter 10 each has an upper face and a lower face that are parallel to each other. The upper face 28 of arm portion 20 is located in the same plane with upper face 30 of arm portion 22, and the lower face 32 of arm portion 20 is located in the same plane with lower face 34 of arm portion 22. A forward face 36 of arm portion 22 extends between the upper and lower faces 30 and 34, respectively. Similarly, a rear face 38 of arm portion 20 extends between the upper and lower faces 28 and 32, respectively, the rear face 38 being parallel to the forward face 36. The forward face 36 and the rear face 38 are each perpendicular to its associated upper and lower faces and are substantially equidistant from the central axis 12. Opposed outer edges 40 and 42 of arm portion 20 extend between the upper and lower faces 28 and 32, being perpendicular thereto. Similarly, opposed outer edges 44 and 46 of arm portion 22 extend perpendicularly between the upper and lower faces 30 and 34. The opposed outer edges 40 and 46 are disposed substantially equidistant from the central axis 12, as are also the opposed outer edges 42 and 44.

Figure 4:
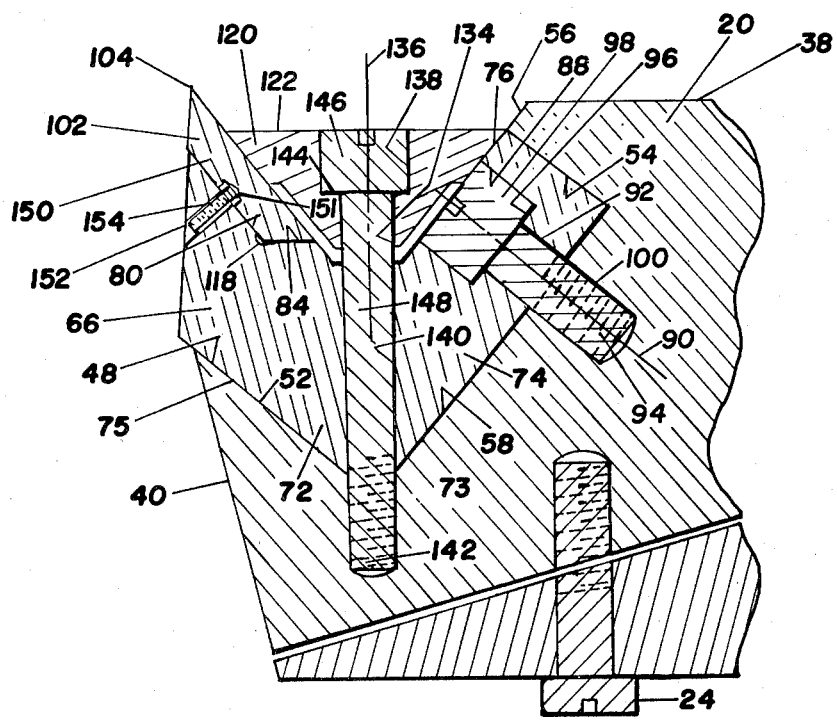
FIG. 4 is a fragmented sectional view of a cutting region of the cutter taken along the lines 4—4 of FIG. 3.

A recess 48 is provided in adjacent portions of the rear face 38 and outer edge 40 of arm portion 20, as seen in FIG. 1 and also in FIGS. 2 and 4. Similarly, a recess 50 is provided in adjacent portions of the forward face 36 and outer edge 46 of arm portion 22. Each of the recesses 48 and 50 is substantially in the form of a rectangular cut. Recess 48 comprises a surface 52 that is forwardly and inwardly inclined from outer edge 40 and a surface 54, parallel to surface 52, that is forwardly and inwardly inclined with respect to rear face 38, surface 54 being offset from rear face 38 by a short forwardly and outwardly inclined surface 56. Surfaces 52 and 54 extend to a bed 58, each of the surfaces 52 and 54 being substantially perpendicular to the bed 58.

Similarly, recess 50 comprises a surface 60 that is rearwardly and inwardly inclined from outer edge 46 of arm portion 22, and a surface 62 that is rearwardly and inwardly inclined with respect to forward face 36, surface 62 being offset from face 36 by a rearwardly and outwardly inclined surface 64. Surfaces 60 and 62 are parallel to each other and extend to a bed 65 that is substantially perpendicularly disposed to each of surfaces 60 and 62. It is noted that bed 65 is substantially parallel to bed 58 of recess 48.

While in the preferred embodiment of the invention illustrated in the drawings, the angle between each of the beds 58 and 65 and the respectively associated surfaces 52, 54 and 60, 62 is substantially 90°, it will be understood that this angle is not critical for the purposes of the invention and that substantial variation may be made, if desired, while retaining, however, the symmetry of structure of the cutting regions 16 and 18, as illustrated.

A hardened alloy cutting insert section or insert holding nest 66 is located in recess 48 of arm portion 20. A similar cutting insert holding nest 68 is located in recess 50 of arm portion 22. Cutting insert sections 66 and 68 may be identical, a perspective view thereof being provided in FIG. 5. In a portion of their external outline, the insert holding nests 66 and 68 conform to the shape of the recess 48 or 50, respectively, in which it is located, the engaging surfaces of the nests and of the recesses being machined to provide a suitable slide fit.

Figure 5:
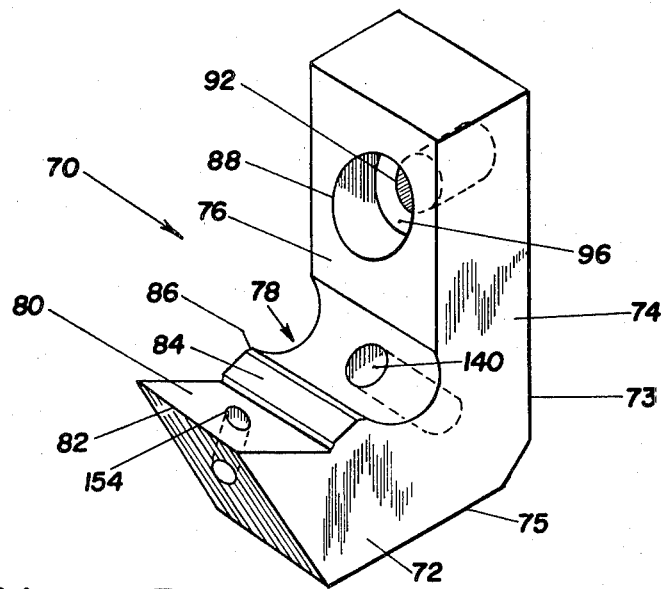
FIG. 5 is a perspective view of a replaceable cutting section insert or nest that is utilized in the cutter according to the invention.

The insert holding nest 66 is recessed, as shown at 70, the recess 70 being preferably substantially V-shaped. The recess 70 is located opposite the juncture of angularly disposed walls 72 and 74 of nest 66, the external surfaces 73 and 75, respectively, of which engage surface 52 and bed 58 of recess 48 in arm portion 20. The recess 70 comprises a step bearing surface 76 that is forwardly inclined from the rear face 38 of arm portion 20 and extends toward the vertex region 78 of the recess 70, which region 78 desirably is rounded, as shown in FIG. 5. A bed 80 is inclined forwardly from the outer edge 82 of nest 66 toward the vertex region and terminates at a seat or shoulder 84. A surface 86 may extend between the shoulder 84 toward the vertex region 78. In a preferred embodiment of the invention, the angle between the bed 80 and the step bearing surface is approximately 80°.

Insert holding nest 66 is bored at 88 along an axis 90 that is substantially perpendicular to the step bearing surface 76, the bore 88 being counterbored at 92. A tap 94 in the cutting arm portion 20 is disposed about the axis 90. The counterbore 92 is provided in insert holding nest 66 to provide a step bearing 96 for the head 98 of a capscrew 100 that is threadedly secured to the cutting arm section 20.

Figure 6:
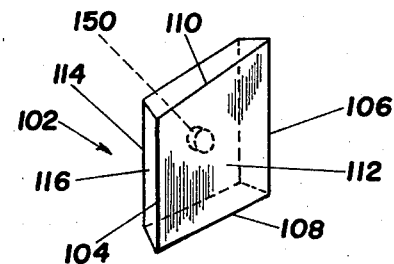
FIG. 6 is a perspective view of a cutter insert that is adapted to be used with the cutting section insert.

A cutter insert or bit 102 is provided as illustrated in FIG. 6, preferably having parallel cutting edges 104 and 106 and parallel cutting edges 108 and 110 disposed perpendicularly to the cutting edges 104 and 106, all of said cutting edges being disposed about a forward or obverse face 112. A reverse or bottom face 114 is disposed parallel to the forward face 112 and extends between bevelled surfaces 116 that extend rearwardly from the cutting edges 104, 106, 108 and 110. The cutter insert or bit 102 is preferably formed of suitable high velocity cutting material such, for example, as tungsten carbide, high speed steel, or a cutting ceramic.

The bed 80 in cutting section 66 desirably is carefully machined to provide a flush platen for substantially all of the rearward or bottom face 114 of the cutter insert 102. The shoulder 84 is disposed at an angle to the bed 80 that is substantially equal to the angle between the bevelled surfaces 116 and the rearward face 114 of the cutter insert 102. Desirably, an undercut indicated at 118 is provided at the apex of the angle between bed 80 and shoulder 84 to minimize the possibility of foreign particles interfering with precision seating of cutter insert 102.

Figure 8:
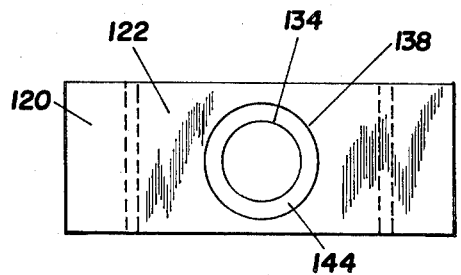
FIGS. 7, 8 and 9 are top plan, side and end views, respectively, of a reversible wedge-shaped clamp that is utilized to hold the cutter in place in the cutting section insert.
Figure 9:
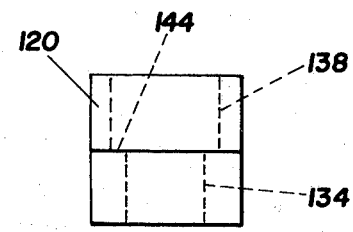
Figure 7:
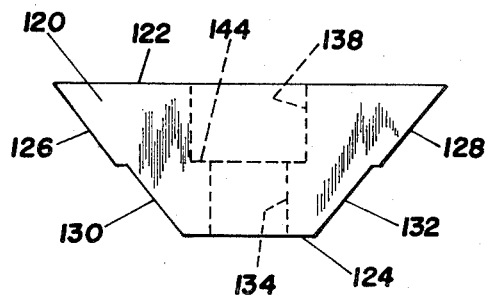

A wedge-shaped reversible hard faced holding clamp member 120, as illustrated in detail in FIGS. 7, 8 and 9, is provided for holding the cutter insert 102 in place against the bed 80 and shoulder 84, and for additionally securing the cutting section insert or nest 66 in the recess 48. Clamp member 120 includes a forward wall 122, a bottom wall 124, a first pair of inwardly inclined end wall portions 126 and 128, and a second pair of inwardly inclined end wall portions 130 and 132, the second pair of inclined wall portions 130 and 132 being inwardly offset a short distance, as shown in FIG. 7, from the first pair of wall portions 126 and 128. The wall portions 126 and 128 are each disposed at an angle with respect to wall 122 such that when seated against cutter insert 102 in recess 70 of cutting insert holding nest 66 they are substantially parallel to bed 80 of nest 66, the wall 122 being substantially parallel to rear face 38 of arm portion 20 of cutter 10. The wall portions 130 and 132 may be disposed at approximately similar angles to wall 122.

Clamp member 120 is bored at 134 along an axis 136 that is substantially perpendicular to the rearward face 38 of cutter 10, the bore 134 being counterbored at 138. A bore 140 in the cutting section insert 66 and a tap 142 in the cutting arm portion 20 are disposed about the axis 136, as seen in FIGS. 2 and 4. The counterbore 138 is provided in clamp 120 to provide a step bearing 144 for the head 146 of a securing capscrew 148 that is threadedly secured in tap 142 of cutting arm portion 20.

A safety recess or detent 150 having a conical inner surface 151 is provided on the rearward or bottom surface 114 of cutter insert 102. Recess 150 fits over a headless socket screw 152 that is screwed into a tap 154 that is provided in bed 80 of the cutting insert nest 66, the center line for the tap 154 being offset 0.010"–0.015" from the center line of detent 150 in the direction of shoulder 84. When the clamp 120 has been tightened and the cutter insert 102 has been forced against seat 80, the screw 152 is turned in tap 154. This forces the inner end of screw 152 against the inclined inner surface 151 of detent 152. The resulting wedging action forces cutter insert 102 into engagement with shoulder 84, thereby properly positioning the cutter insert 102, even after repeated sharpening of the cutting edges of the cutter insert 102.

Clamp 120 is hard faced to resist chip erosion and is reversible, that is to say, it may be employed in either of two positions to retain cutter insert 102 in operative cutting position in cutting insert section or nest 66. Being counterbored, clamp 120 allows the securing capscrew head 146 to be buried, and thereby, allows free passage of chips.

Cutting insert section or nest 66 is made of a hardened alloy steel that is substantially stronger and harder than the material, typically cold finished low carbon steel, of the major cutter body portions 20 and 22. Nest 66 is easily replaced without removing the cutter body 20 from the drive shaft or spindle to which the cutter body portion 20 is attached. Removal and replacement of the nest 66 is facilitated in that there are only two holding screws, capscrews 100 and 148, one of which, capscrew 148, also secures the cutter insert 102 in cutting position through the clamp 120.

The structure of the cutting insert section or nest 68 and its orientation in recess 50 of the cutting arm portion 22 may be identical to that of the insert holding nest 66 in recess 48. That is to say, in the first embodiment of the invention illustrated in FIGS. 1–9, the cutting arm regions 16 and 18 may be formed substantially identical to each other and are similarly related to the cutter inserts or bits 102 utilized therewith.

With this arrangement there is defined, as shown in FIG. 2, a cutting region that is disposed about an arc of a circle 156 and having an effective plane 158 disposed along the diameter of the circle 156 and defined by the cutting edges 104 of the cutter inserts 102 mounted in each of the cutting regions 16 and 18. The rake of the cutting edge 104 accordingly may be positioned at the most efficient cutting angle for cutting and for producing wood chips having consistency of size and shape. The rake angle illustrated in FIG. 2 is approximately 35°. This angle while efficient for certain work pieces may not be the most efficient for others, the most efficient rake angle being influenced by hardness and other characteristics of the work piece being processed. FIG. 2 illustrates the comparative freedom during cutting, from cutter clamp and holder interference, and the cutting geometry.

Dowel holes as indicated at 159, 160, 161 and 162 in FIG. 1 may be provided in cutter 10 to facilitate the assembly of a stagger/stack of a plurality of angularly displaced cutters 10 on the same spindle or shaft thereby to form an array of cutting regions 16 and 18 in the form of a helix about the shaft. As shown, holes 159 and 161 are provided in the upper surfaces of the cutter arm portions 20 and 22 and the holes 160 and 162 are formed in the lower surfaces thereof. Inasmuch as such a stagger/stack cutter assembly is fully disclosed in my prior U.S. Pat. No. 3,237,725, it will not be described in detail herein. It is noted that in the use of such an assembly, a log or other work piece to be cut may be positioned parallel to the plane of the cutter shaft and moved transversely to the cutters thereby to make a so-called reference cut.

By way of illustration only and not limitation, it is noted that in an operative form of the first embodiment of the invention illustrated in FIGS. 1–9, the cutter arm portions are made of cold finished low carbon steel and so dimensioned as to place the cutting tips of the cutter inserts 102 of the cutting regions on a circle having a 12 inch (30, 48 cm.) diameter, the forward face 36 of cutter arm portion 22 and the rear face of cutter arm portion 20 are each one inch (2.54 cm.) thick, the distance between the faces 36 and 38 is four inches (10.16 cm.), and the diameter of the collar 14 is three inches (7.62 cm.). The cutting insert holding nests 66 and 68 are each made of hardened alloy steel, the width of the step bearing face 76 and bed being one inch (2.54 cm.), and the tap 154 for the hardened dowel pin 15 is ¼ inch (6.35 mm.) in diameter. The clamp 120 is made of cold finished low carbon steel that is hard faced with chrome, the width of the upper wall 122 being one inch (2.54 cm.). The cutter inserts 102 are made of a tungsten carbide or high speed steel.

In FIGS. 10–18 there is illustrated a second cutting tool embodiment of the invention comprising a 4-wing indexable insert cutter indicated at 164 that is adapted for use as top or side heads on chippers and edgers and includes a shaver blade for fine face milling or planing.

Figures 10, 13:
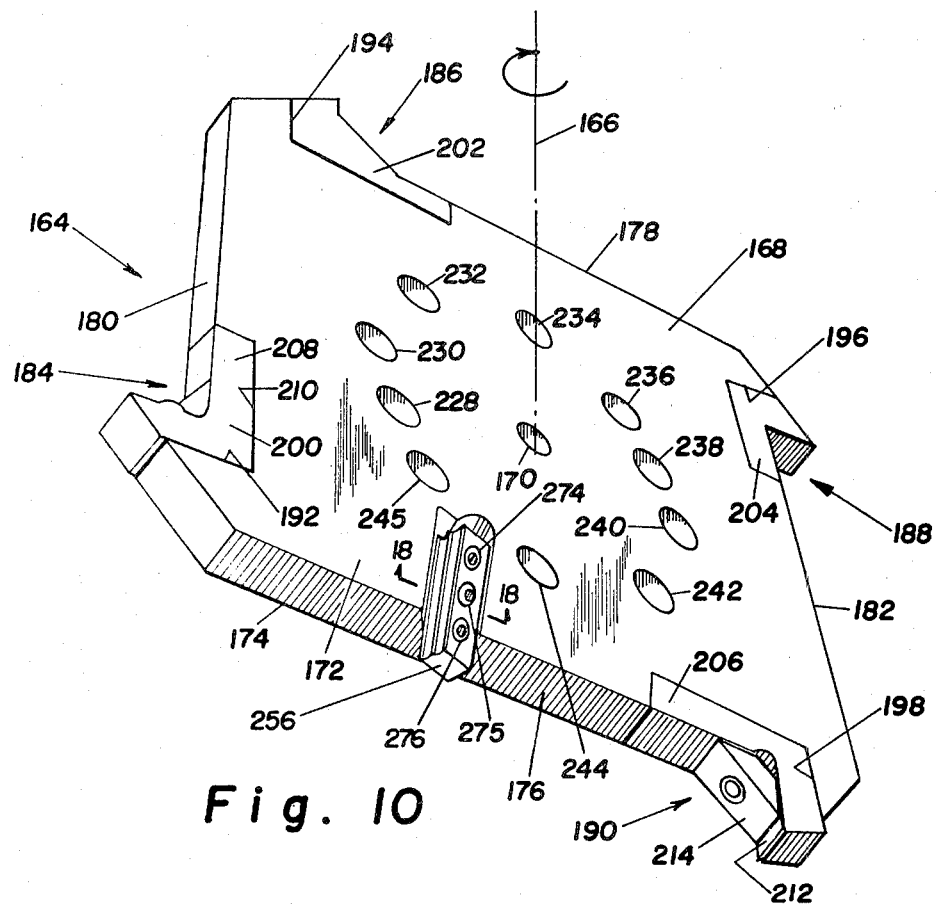
FIG. 10 is a perspective view of a second embodiment of the invention comprising a 4-wing chipper-/edger side head cutting tool, including a shaver blade.
FIG. 13 is a diagrammatic fragmented end view of a stagger/stack assembly of cutting tools according to the second embodiment of the invention.

Cutter 164 is rotatable about a central axis 166 as indicated in FIG. 10 and comprises a four sided, generally square, cutter body 168 having a collar portion 170. While collar portion 170 is shown as a relatively small opening, it will be understood that the size of the collar portion 170 normally is dictated by the intended application of the cutter and is cut to desired size by the user.

Cutter body 168 has an upper face 172 and a lower face 174 that are parallel to each other. A forward face 176 extends perpendicularly between the upper and lower faces 172 and 174, respectively. Similarly, rear face 178 extends perpendicularly between faces 172 and 174, the rear face 178 being parallel to the forward face 176. Opposed edge faces 180 and 182 also extend perpendicularly between faces 172 and 174. Forward face 176, rear face 178, and the opposed edge faces are all perpendicular to each other and are substantially equidistant from the central axis 166.

Cutter 164 further comprises four cutting regions as indicated generally at 184, 186, 188 and 190, one such region being provided adjacent each of the four corner regions of cutter body 168. Recesses 192, 194, 196 and 198 associated with cutting regions 184, 186, 188 and 190, respectively. Each of the recesses 192, 194, 196 and 198 is generally in the form of a rectangular cut, similar in shape to the recesses 48 and 50 of the first described embodiment of the invention.

A replaceable hardened alloy cutting insert section or insert holding nest is located in each of recesses 192, 194, 196 and 198, as indicated at 200, 202, 204, and 206. Each of the cutting insert holding nests may be identical in construction to the insert holding nest 66 of the first embodiment of the invention. It will be understood, however, that, as previously indicated, if desired, the shape of the insert holding nests 200, 202, 204 and 206 may be modified. In FIG. 10 a modified form of insert holding nest is shown, the modification comprising a lengthening of the portion thereof, indicated at 208, that engages the bed 210 of the recess 192. Such modification of the holding nests necessarily entails a corresponding lengthening of the associated bed 210.

Figure 11:
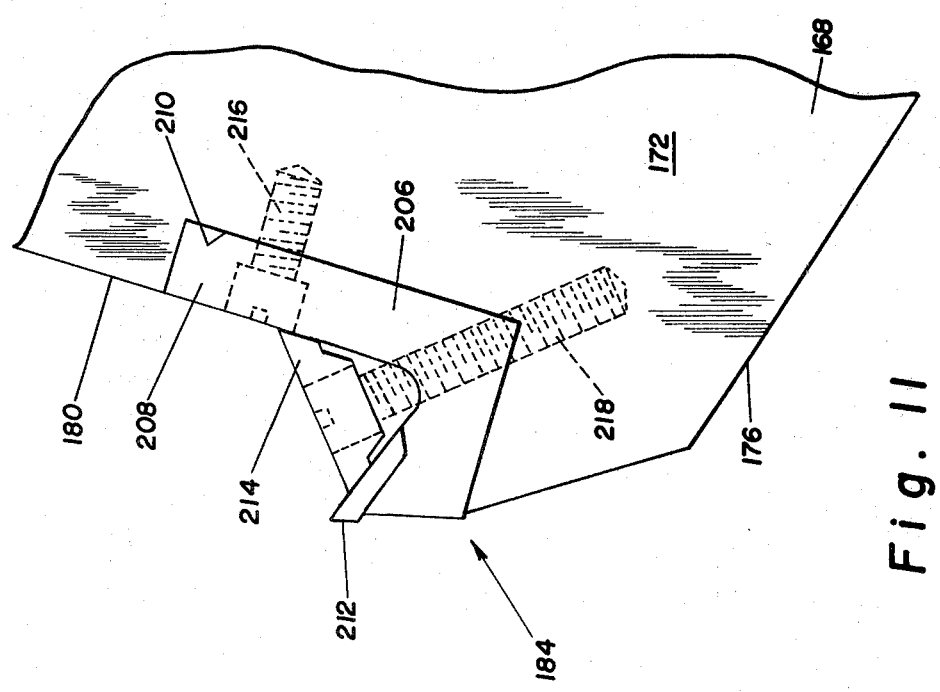
FIG. 11 is a fragmented top plan view showing one of the cutting regions of the cutter of FIG. 10.
Figure 1:
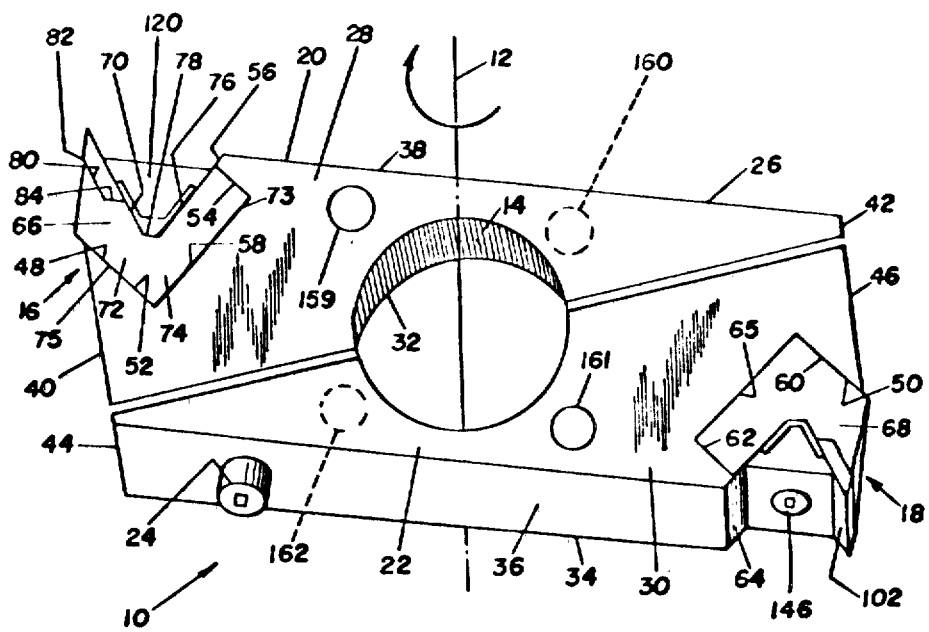
Figure 4:
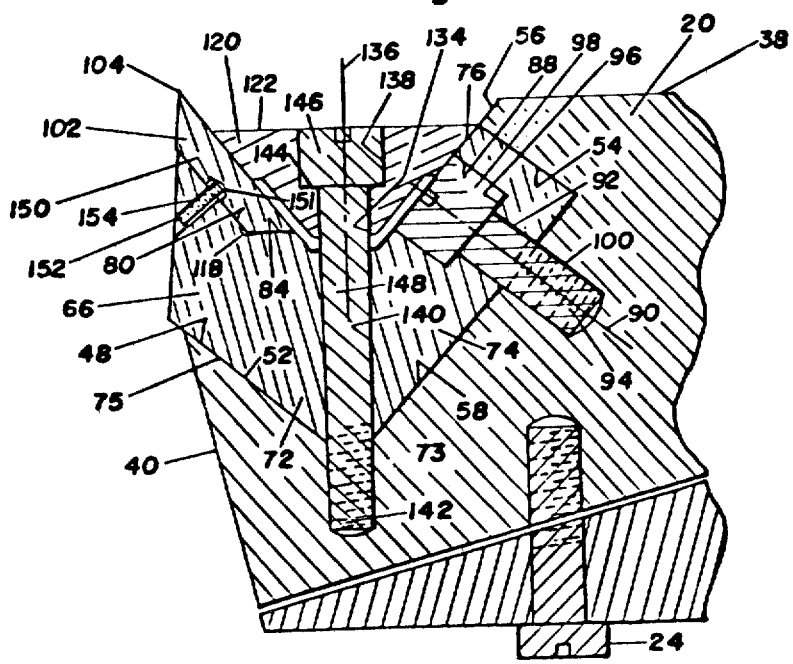
Figure 5:
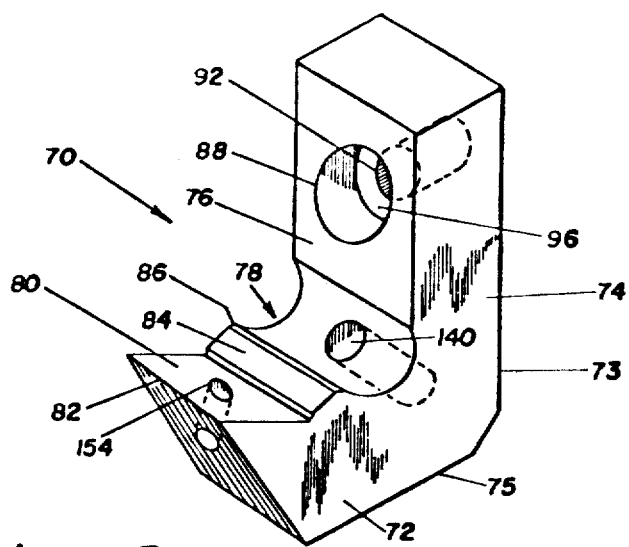
Figure 8:
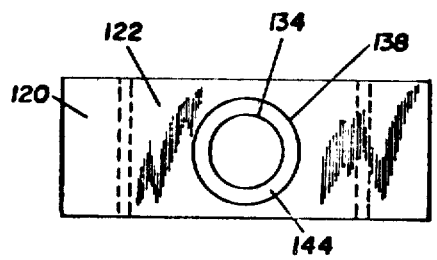
Figure 9:
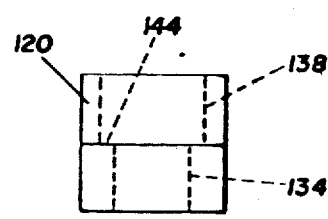
Figure 7:
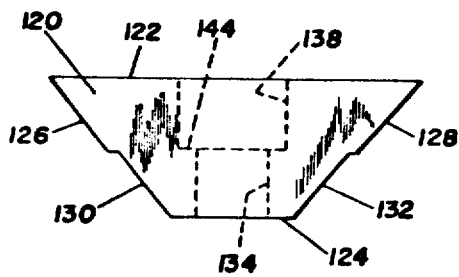
Figure 6:
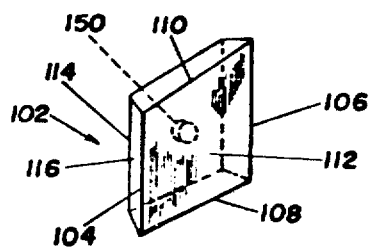
Figure 10:
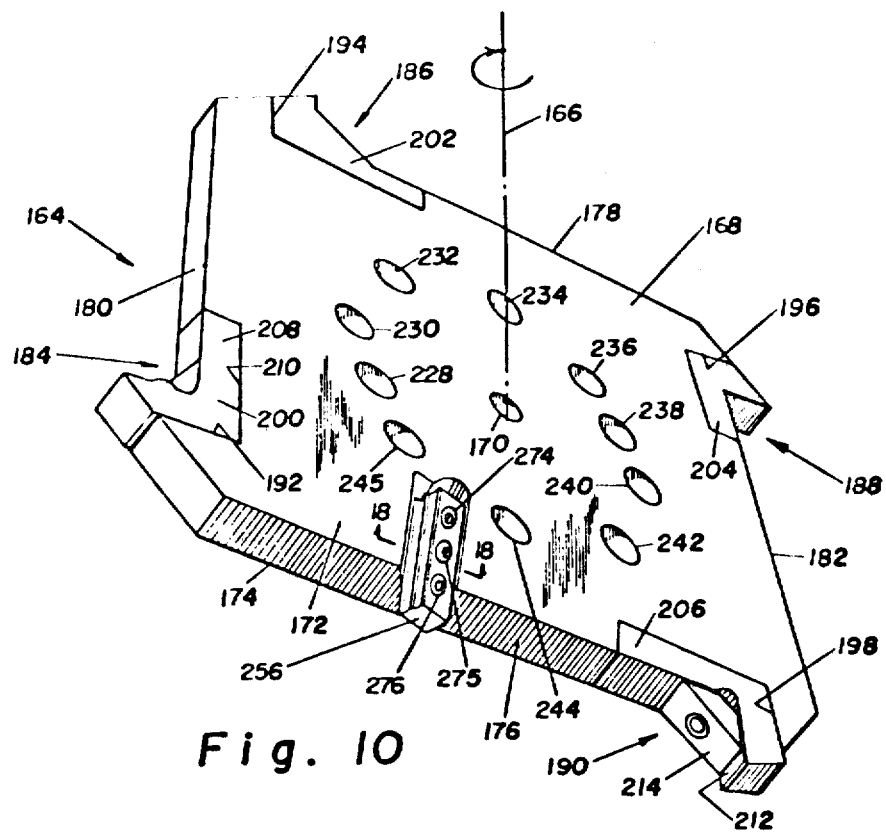
Figure 13:
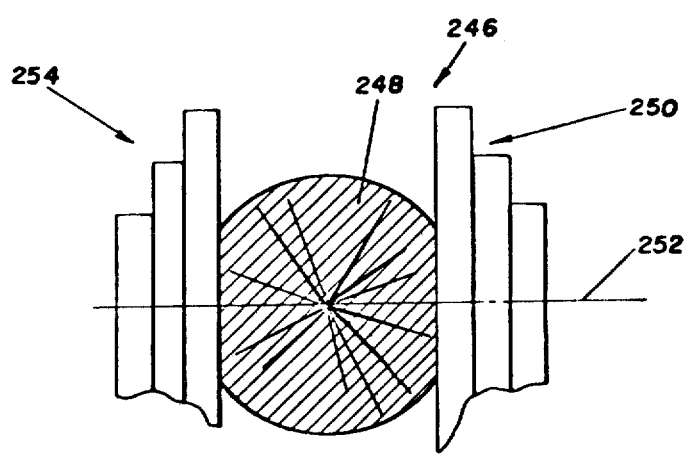
Figure 14:
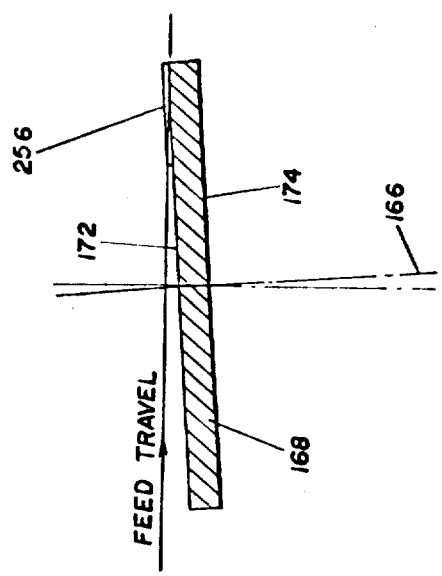
Figure 11:
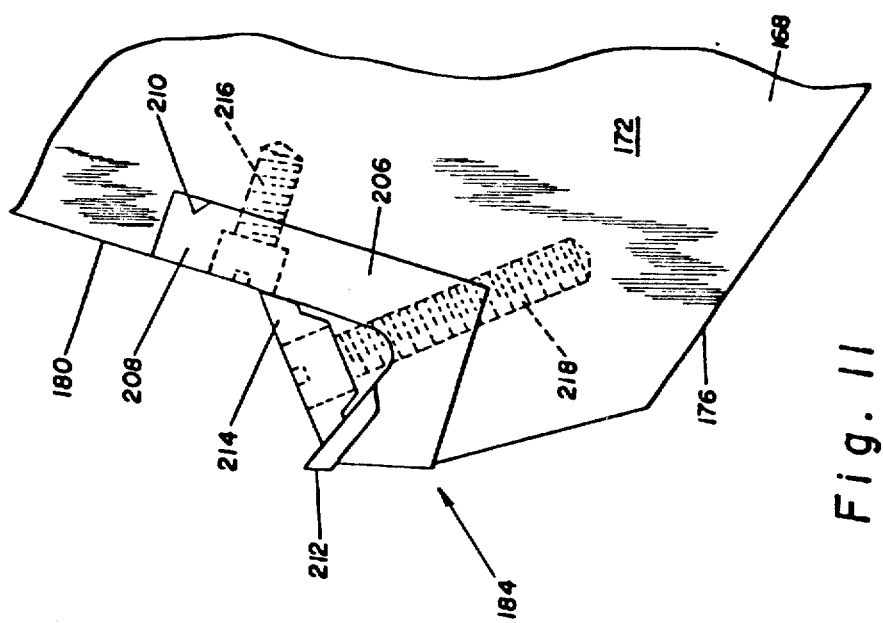

Each insert holding nest 200, 202, 204 and 206 includes an associated four-sided cutter insert 212 and a reversible holding clamp as indicated at 214 in FIGS. 10 and 11 that may be identical to the cutter insert 102 and holding clamp 120 of the first described embodiment of the invention. As shown in FIG. 11, capscrews 216 and 218 are provided for retaining the cutting insert holding nest 206 and clamp 214, respectively, in position. As in the first embodiment of the invention, removal and replacement of the insert holding nest 206 requires the removal of only the capscrews 216 and 218.

By way of illustration and not limitation, it is noted that in a practical operative embodiment of the cutter 164, the cutter body 168 desirably is made of cold finished low carbon steel approximately 1 1/16 inches (2.69 cm.) thick, each of the cutting insert holding nests 200, 202, 204 and 206 is made of hardened alloy steel and each of the associated clamps is hard faced with chrome, the hardened cuttng insert holding nests and the clamps each being one inch (2.54 cm.) wide, and the cutter inserts 1 3/16 inches (3.07 cm.) square. A wide range of cutting diameters may be realized, for example, from 12 inches (30.48 cm.) to 42 inches (106.68 cm.). Desirably, the dowel holes 228–245 that are further referred to hereinafter may be placed on a circle 8 inches (20.32 cm.) in diameter.

Figure 12:
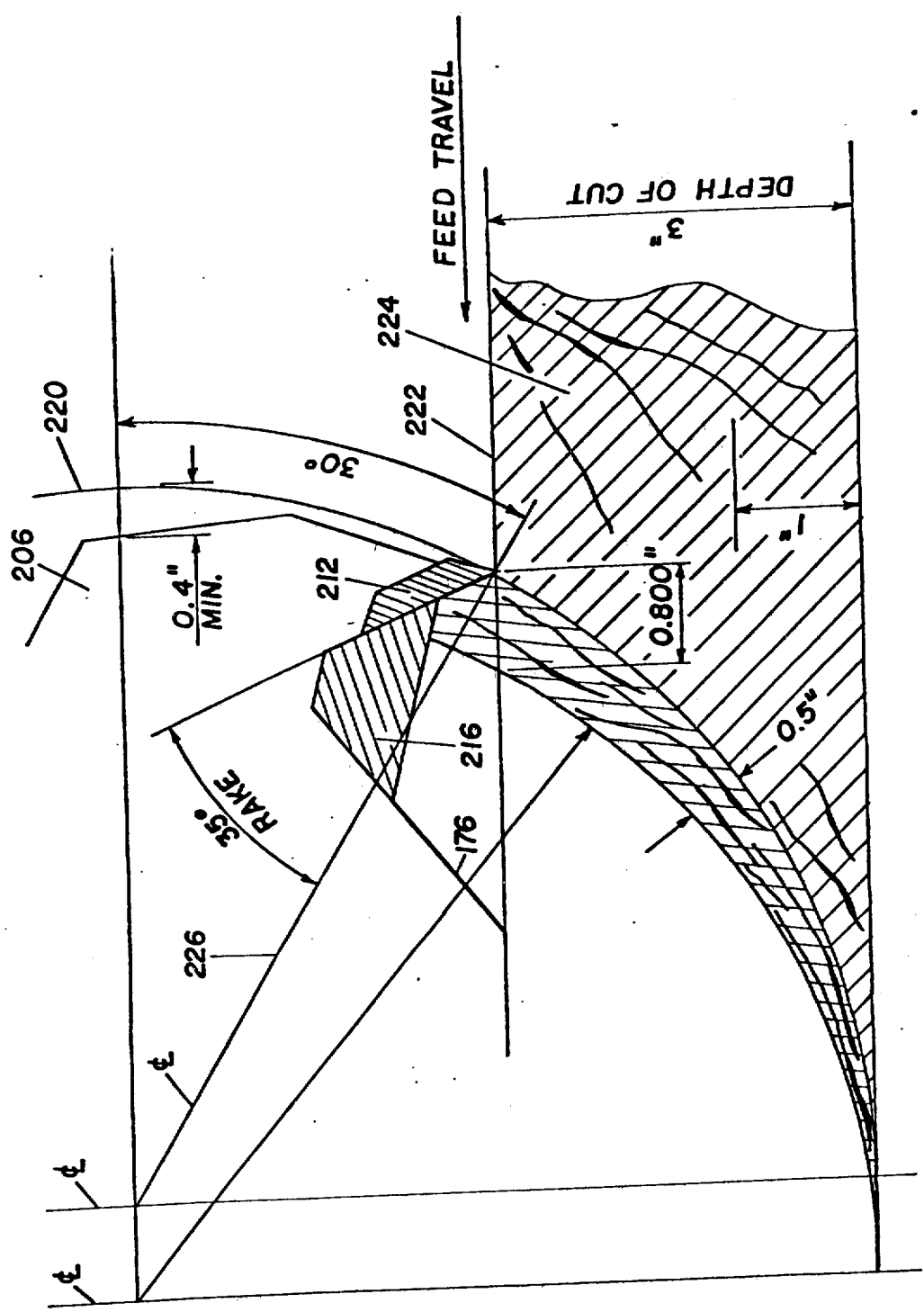
FIG. 12 is a diagram illustrating a geometric layout for a cutting tool according to the second embodiment of the invention.

FIG. 12 illustrates the geometrical layout for a 0.800 inch (2.03 cm.) chip load 12 inches (30.48 cm.) diameter 4-wing chipper/edger cutting tool according to the second embodiment of the invention as shown in FIG. 10 for effecting so-called climb cutting. There is shown in FIG. 12 an arcuate path 220 that is traced successively by the cutter inserts or bits at each of the cutting regions 184, 186, 188 and 190 of the cutter body 168 as the cutter 164 is rotated on the central axis 166. The cutter insert 212 of cutting region 190 is shown in FIG. 12 as just having moved into engagement with the surface 222 of a work piece 224 about to be cut, the cutting tip of cutter insert 212 and the surface 222 of work piece 224 coinciding at an effective plane 226 that is disposed along the diameter of the circle of which arcuate path 220 is a portion.

During the rotation of the cutter 164 about the central axis 166, the work piece 226 is fed or advanced toward the cutter 164. The rate of feed of work piece 226 is such that the initial thickness of each cut of work piece 224 is 0.800 inches (2.03 cm.), and the geometry is such that the depth of the cut is three inches (7.62 cm.), the rake of the cutting angle being 35°. With the work piece 224 uniformly fed at such a rate toward the cutter 164, each of the successive cuts by the cutting regions 184, 186, 188 and 190 is substantially the same as the immediately preceding cut. This brings about a desired consistency of size and shape of the chips produced, and as a consequence, desirable chip quality.

Dowel holes, as indicated at 228–245 in FIG. 10, desirably are provided in the cutter body 168 to facilitate the assembly of a plurality of cutters 164 on the same spindle or shaft in uniformly angularly spaced relation thereby to form an array of cutting regions 184, 186, 188 and 190 of each of the plurality of cutters 164 in the form of a helix about the shaft 166. It is noted that lateral spacing of such stagger/stack arrays of a plurality of cutters 164 is facilitated by having the side edge of the cutter inserts of each cutter abut against the adjacent cutter body.

A typical example of the use of such stagger/stack assemblies of cutters 164 is provided in FIG. 13 wherein two stagger/stack assemblies, indicated collectively at 246, are shown cutting the opposite sides of a work piece, for example a log 248 that is being fed at a predetermined rate against the assemblies 246 in a direction out of the plane of the drawing. Specifically, a first cutting stagger/stack assembly 250 that is mounted for rotation about a shaft 252 is provided for cutting one side of log 248. A second such cutting stagger/stack assembly 254, also mounted for rotation on shaft 252, is provided for cutting the other side of log 248.

Figure 14:
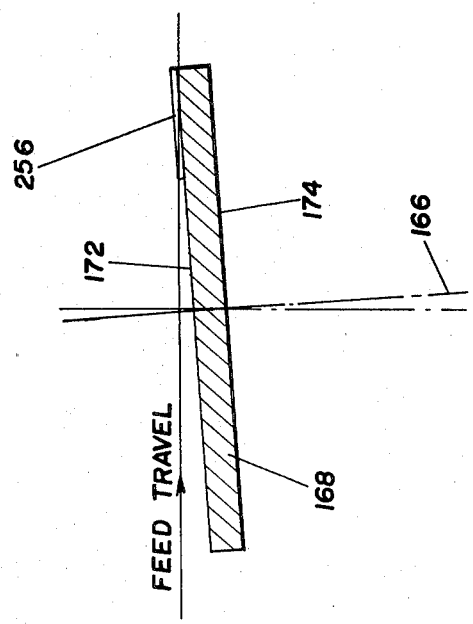
FIG. 14 is an edge view of the cutter of FIG. 10 illustrating the set up for eliminating back drag or heeling of the cutters.

In cutting operations known in the art as side head face milling where the face 172 of cutter body 168 of FIG. 10 is disposed closely adjacent the surface of the work piece being cut, cutting of the work piece being effected by the side edge of the cutter insert 214 instead of or in addition to the outer edge thereof, there is a necessity to eliminate "back drag", that is, drag caused by heeling or rubbing of the side of the cutter 164 opposite the then effective cutting region 184, 186, 188 or 190 against the wood. For the purpose of eliminating such back drag, the shaft 166 of cutter 164, as illustrated in FIG. 14, is tilted slightly off the perpendicular or 90° relation with respect to the cutter surface, surface 172, for example, that is adjacent the wood member being cut, to allow about 0.020 inches (0.508 mm.) relief from the initial cutting side of the cutter 164. While this produces some concavity on the surface that is cut, the concavity is minimal.

Figures 16, 17:
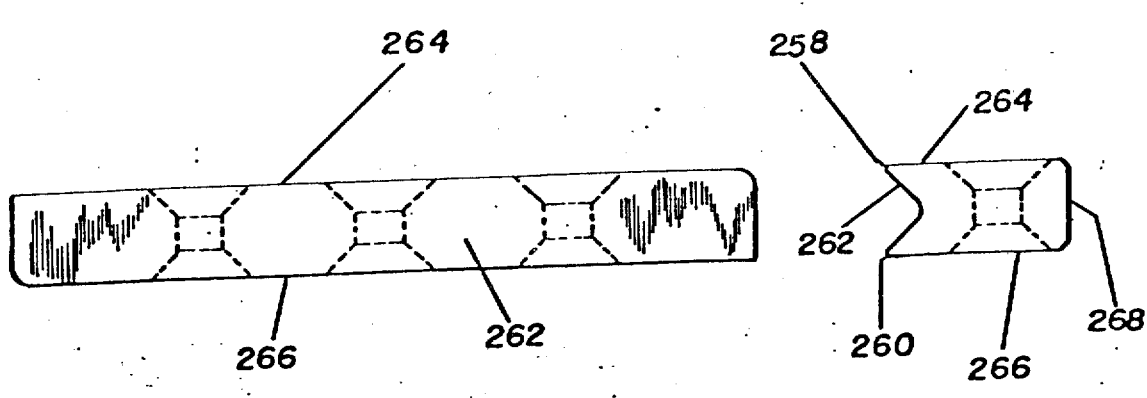
FIGS. 15, 16 and 17 are top plan, side and end views of a shaver blade that is employed in the second embodiment of the invention.
Figure 15:
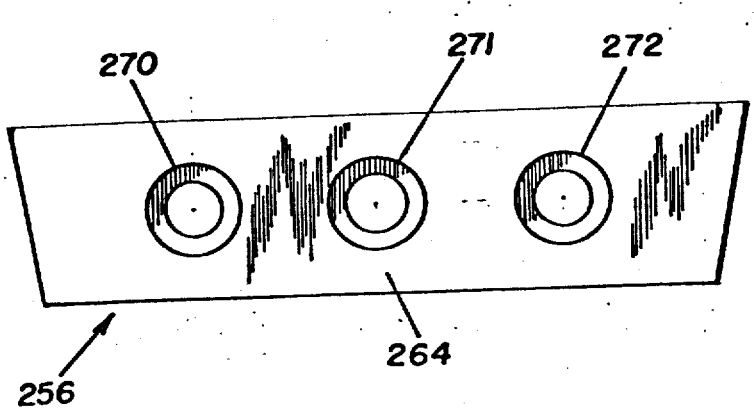
Figure 18:
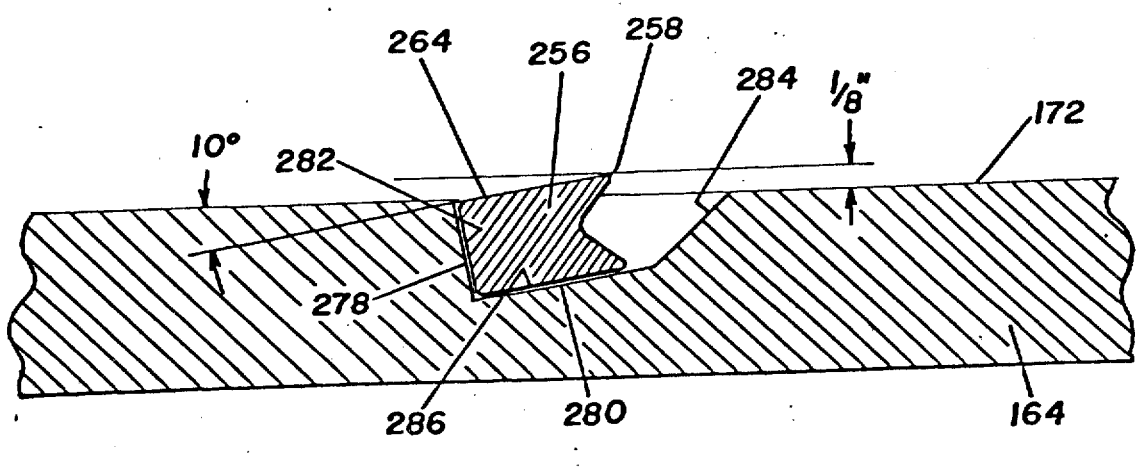
FIG. 18 is a cross sectional view of the shaver blade and cutter body taken along the lines 18—18 of FIG. 10.

The second embodiment of the invention is further characterized, as shown in FIGS. 10 and 14–18 by the provision of a reversible shaver blade 256 that is provided on the upper face 172 of cutter body 168. Top, side and end views of the shaver blade 256 are shown in FIGS. 15, 16 and 17, respectively. FIG. 18 is a cross sectional view of the shaver blade 256 and cutter body 168 and shows the shaver blade 256 solidly embedded in the upper surface 172 of cutter body 168 with a cutting edge extending outwardly from the surface 172 approximately one-eighth inch. Such extension outwardly of a cutting edge of shaver blade 246 is also depicted in FIG. 14.

Shaver blade 256, as seen in FIGS. 15, 16 and 17, is provided with two cutting edges 258 and 260 that are provided along an elongated V-shaped forward face 262, the cutting edges 258 and 260 being sharpened on approximately a 5° angle as indicated in the drawings. Blade 256 includes an upper face 264 and a lower face 266. A rear face 268 extends perpendicularly between the upper and lower faces 264 and 266, parallel to the plane containing the cutting edges 258 and 260. Holes indicated at 270, 271 and 272 are provided for securing blade 256 to the cutter body 168, each hole being counter sunk at both the upper face 264 and the lower face 266. Flat head screws 274, 275 and 276 are provided for securing blade 256 to the cutter body 164. The shaver blade 256 is positioned on the upper face 172 of cutter body 168 as shown in FIG. 10 extending about ⅛" beyond the edge 176. It is noted that more than one shaver blade can be provided in association with other edges of cutter body 168, if desired.

As shown in the cross sectional view of FIG. 18, the upper face 172 of cutter body 164 is provided with a trapezoidal shaped recess 278 in which shaver blade 256 is positioned. Recess 278 has a bed 280 that is inclined upwardly with respect to surface 172 at an angle of about 10°, and a rear facing surface 282 disposed at an angle of substantially 90° with respect to bed 280, the depth of surface 282 being substantially equal to or slightly less than the depth of shave blade 256. Recess 278 further includes a forward facing surface 284 that is inclined toward the surface 172 at an angle of about 135° with respect to the bed 280, the width of the bed 280 being somewhat greater than the width of the shaver blad 256 to allow free passage of shavings.

In accordance with the invention, the length of the shaver blade 256 must be at least equal to and may be slightly more than the total feed increment of the log or other work piece being processed. That is to say, as the side cutting regions 184, 186, 188 and 190 each successively functions to effect a cut in the wood member or log being processed during a single revolution of the cutter body 168, the distance advanced by the work piece during each such revolution must be no more and preferably is slightly less than the length of the shaver blade 256. With such relationship, the cutter blade 256 is effective once during each revolution of cutter body 168 to function to provide a cleaner and smoother surface to the log being processed. Being separate from the main cutting inserts of the cutter 164, the cutter blade 256 embodies the flexibility for geometrical adjustment to achieve the desired relationship to cut surface. The shaver blade 256 facilitates out-of-square adjustment by "shimming", as by the use of a shim 286 that is tapered longitudinally to effect a gradual diminution in the height of cutting edge 258 above surface 172 of cutter 168 along the length of shaver blade 256. This enables compensation for the out-of-square condition that is necessary to avoid the previously mentioned phenomena of back drag of heeling. The resulting finish to the work piece being processed approximates a planed surface, which in many cases, requires no further machining.

A feature of the shaver blade 256 is its reversibility. When the cutting edge, 258, for example, of the blade that has been in use becomes dull, the blade 256 may be removed from the cutter body 168 by removal of the flat head screws 274 and 276 and turned around to present the other cutting edge 260 in cutting position. The angular disposition in the V-shaped forward face 262 of blade 256 and the angle of bed 280 in cutter body 168, as illustrated in FIG. 18, are such as to provide a rake angle of 35° for each of the blade cutting edges 258 and 260.

Thus, there has been provided according to the invention, improvements in the cutting tool art that provide smoother cutting, more accurately cut surfaces, consistency of size and shape of chips, and additionally, that facilitate necessary replacement upon deterioration of the tool in use and confine the replacement to the damaged area. Hardened alloy insert holding nests that economically can be made stronger than the major cutter body, are easily replaced without removing the cutter body from the drive shaft. The holding nests, moreover, are characterized by their provision of a hard faced clamp for holding indexable cutter inserts that facilitates indexing and replacement of the cutter inserts while allowing free passage of chips with a minimum of interference with the cutting function.

A further feature of the invention is the provision of a shaver blade that is effective, in cooperation with the main cutting inserts of a cutting tool, to effect smoother cutting providing a finish approximating a planed surface.

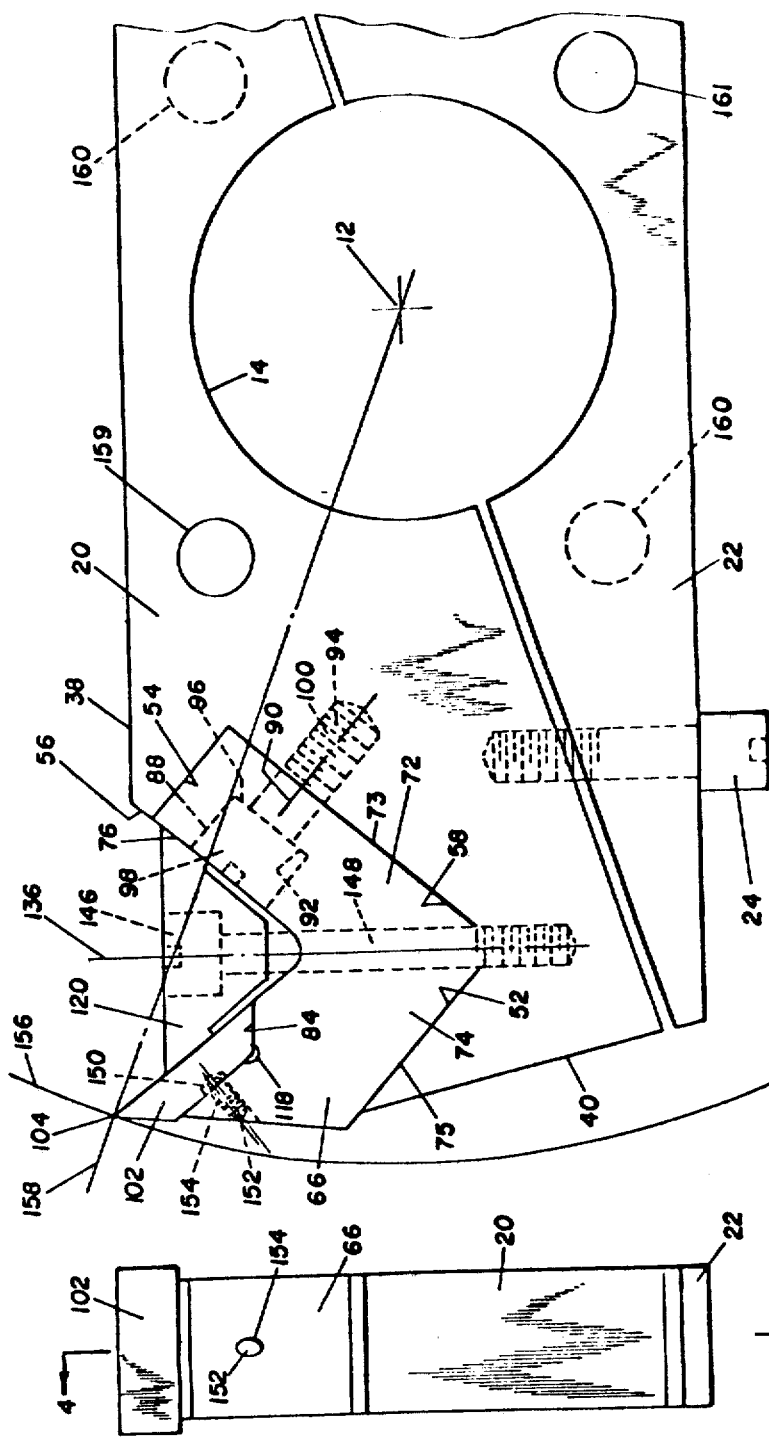

I claim:

1. A cutting tool comprising a cutter body having a forward face, a rearward face, and opposed outer edges, said cutter body having a cutting region comprising, a first recess formed in one of said faces adjacent at least one of said outer edges,
tap means in said first recess,
a replaceable cutting insert positioned in said first recess, said cutting insert being made of a material that is stronger than the material of which said cutter body is made, said cutting insert having angularly disposed wall means forming a second recess with a seat and bed therein, said bed extending from an outer edge of said second recess to said seat, and said wall means having first bore means therein in alignment with said tap means, a clamp member positioned in said second recess and having second bore means therein in alignment with said first bore means in said wall means, and bolt means including a first bolt extending through said first bore means and said second bore means into engagement with said tap means to draw said clamp member into engagement with a cutter insert disposed on said bed and seat with a cutting edge disposed outwardly of said second recess.

2. A cutting tool as specified in claim 1 wherein said cutter body is made of cold finished low carbon steel and said cutting insert is made of a hardened steel alloy.

3. A cutting tool as specified in claim 1 wherein said clamp member is hard faced with chrome and is reversible.

4. A cutting tool as specified in claim 1 wherein said bore means in said clamp member is counterbored to provide a step bearing for the head of said first bolt.

5. A cutting tool as specified in claim 1 wherein said tap means in said first recess comprises a first tap and a second tap, said first bolt engaging said first tap, and wherein said angularly displaced wall means includes first wall means in which said seat and bed are formed and includes second wall means having third bore means therein in alignment with said second tap in said first recess, and said bolt means further includes a second bolt extending through said third bore means into engagement with said second tap to hold said cutting insert in said first recess.

6. A cutting tool as specified in claim 5 wherein said third bore means in said second wall means is counterbored to provide a step bearing for the head of said second bolt.

7. A cutting tool as specified in claim 6 wherein the bore means in said clamp member is counterbored to provide a step bearing for the head of said first bolt.

8. A cutting tool as specified in claim 6 wherein said third bore means in said second wall means and said second tap in said first recess are so positioned that the head of said second bolt is at least partially disposed beneath said clamp member.

9. A cutting tool as specified in claim 1 further including a safety detent to prevent the cutter insert from being dislodged from said bed and said seat in said second recess, the cutter insert being characterized in having a recess provided in a portion thereof, and said detent comprising a hardened screw in said replaceable cutting insert that protrudes into said recess.

10. A cutting tool as specified in claim 5 further including a detent to position and to prevent the cutter insert from being dislodged from said bed and said seat in said second recess, the cutter insert being characterized in having a recess with a conical inner surface provided in a portion thereof, and said detent comprising a hardened socket screw extending through said first wall means, the center line of said screw being offset slightly inwardly of said second recess with respect to the center line of said cutter insert recess, said socket screw protruding into the cutter insert recess into firm engagement with said conical inner surface whereby said cutter insert is forced inwardly of said second recess.

11. A cutting tool as specified in claim 1 wherein said cutter body is formed with two diametrically opposite cutting regions that are disposed about a central axis of the cutter body with the cutting edges of the cutter inserts at the cutting regions facing in the same direction in a circle about the central axis.

12. A cutting tool as specified in claim 1 wherein said cutter body is generally square in shape and is formed with a cutting region adjacent each of the four corners, each of the cutting regions being rotatable about a central axis of the cutting body with the cutting edges of the cutting inserts at each of the cutting regions being operative to effect the cutting function while moving in the same direction in a circular path about the central axis, said cutter body being approximately perpendicular to the central axis.

13. A cutting tool as specified in claim 12 wherein said cutter body further includes an upper face and a lower face and further includes a shaver blade provided in association with said upper face, said shaver blade being disposed generally radially with respect to the central axis of said cutter body and having a length at least as long as the distance advanced by the work piece being processed during a single revolution of said cutter body about said central axis.

14. A cutting tool as specified in claim 13 wherein said shaver blade is rectangular in shape having an upper surface, a lower surface, a forward face, a rear face parallel to the forward face, and oppositely disposed edges, said forward face having a V-shaped recess formed therein, the upper and lower edgs of the recess each forming a cutting edge.

15. A cutting tool as specified in claim 14 wherein said shaver blade is recessed in the upper surface of the cutter body with the rear face of said shaver blade approximately flush with the upper face of said cutter body and cutting edges extending upwardly at an angle of about 10° with the upper face of said cutter body.

16. A cutting tool as specified in claim 15 wherein the angle of the V-shaped recess in said shaver blade is such as to provide a rake angle of about 35°.

17. A cutting tool as specified in claim 12 wherein the cutting edges at each of the cutting regions extend axially outwardly of said second recess.

18. A cutting tool as specified in claim 17 wherein the cutter body is offset slightly from the perpendicular with respect to the central axis in order substantially to eliminate back drag, said offset introducing a slight concavity to the cut surface.

19. A cutting tool as specified in claim 18 wherein said cutter body further includes an upper face and a lower face and further includes a shaver blade disposed in a recess provided in said upper face and having a cutting edge positioned generally radially with respect to the central axis of said cutter, said shaver blade having a length at least as long as the distance advanced by the work being processed during a single revolution of the cutter body about the central axis.

20. A cutting tool as specified in claim 19 further including shimming means to angularly displace the cutting edge of said shaver blade longitudinally with respect to the central axis of the cutter body to compensate for the angular offset of the cutter body from the central axis thereby to eliminate said concavity in the cut surface.

21. A cutting tool as specified in claim 20 wherein said shaver blade is rectangular in shape having an upper surface, a lower surface, a forward face, a rear face parallel to the forward face and oppositely disposed edges, said forward face having a V-shaped recess formed therein, the upper and lower edges of the recess each forming a cutting edge, and wherein said shaver blade is recessed in the upper face of said cutter body with a cutting edge of said blade extending upwardly at an angle of about 10° with the upper face of said cutter body, said shaver blade being reverseable in the recess in the cutter body.

22. A cutting tool comprising, a cutting section having a bed and an adjoining shoulder, a clamp, a cutter insert, said cutter insert being adapted to be held in said bed by said clamp and having a conical recess therein in facing said bed, said bed having a tap therein that with respect to said recess, is slightly offset therein towards said shoulder with said cutter insert in engagement with said shoulder, and a screw in said tap, said screw when tightened engaging said conical recess and forcing said cutter insert into firm engagement with said shoulder.

23. A cutting tool as specified in claim 22 wherein said cutter insert has four cutting sides and a flat bottom side, said bottom side facing said bed and having said recess centrally located therein, and wherein one of said cutting sides engages said shoulder when the center line of said tap is slightly offset towards said shoulder with respect to the center line of said recess.

* * * * *

UNITED STATES PATENT AND TRADEMARK OFFICE
CERTIFICATE OF CORRECTION

PATENT NO. : 4,396,315
DATED : August 2, 1983
INVENTOR(S) : Burton E. Middleton

It is certified that error appears in the above-identified patent and that said Letters Patent is hereby corrected as shown below:

On the title page, "23 Claims, 18 Drawing Figures" should read --23 Claims, 22 Drawing Figures--.

Signed and Sealed this

Tenth Day of July 1984

[SEAL]

Attest:

Attesting Officer

GERALD J. MOSSINGHOFF
Commissioner of Patents and Trademarks

UNITED STATES PATENT AND TRADEMARK OFFICE
CERTIFICATE OF CORRECTION

PATENT NO. : 4,396,315

DATED : August 2, 1983

INVENTOR(S) : Burton E. Middleton

It is certified that error appears in the above-identified patent and that said Letters Patent are hereby corrected as shown below:

Copies are attached of the 7 sheets of drawing that should have been included in the patent. The sheet number designations at the top of the first five sheets of drawing of the patent, as issued, have been corrected to read, as follows:

On attached photocopies of the 6th and 7th sheets of drawing, respective sheet number designations have been provided, as follows:

-- Sheet 6 of 7 --

-- Sheet 7 of 7 -- .